US008732698B2

(12) United States Patent
Ling et al.

(10) Patent No.: US 8,732,698 B2
(45) Date of Patent: May 20, 2014

(54) APPARATUS AND METHOD FOR EXPEDITED VIRTUAL MACHINE (VM) LAUNCH IN VM CLUSTER ENVIRONMENT

(75) Inventors: Xiaofeng Ling, Shanghai (CN); Pingping Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 2237 days.

(21) Appl. No.: 11/437,345

(22) Filed: May 19, 2006

(65) Prior Publication Data

US 2007/0074208 A1    Mar. 29, 2007

(30) Foreign Application Priority Data

Sep. 29, 2005    (WO) ................ PCT/CN2005/001623

(51) Int. Cl.
*G06F 9/455* (2006.01)
(52) U.S. Cl.
USPC ............................................................ 718/1
(58) Field of Classification Search
USPC ............................................................ 718/1
See application file for complete search history.

(56) References Cited

U.S. PATENT DOCUMENTS

| 5,488,713 | A | 1/1996 | Norton et al. |
| 6,513,158 | B1 | 1/2003 | Yogaratnam |
| 6,766,366 | B1 | 7/2004 | Schafer et al. |
| 7,257,811 | B2 * | 8/2007 | Hunt et al. ........................ 718/1 |
| 7,536,525 | B2 * | 5/2009 | Chandrasekaran et al. .. 711/165 |
| 7,594,049 | B1 * | 9/2009 | Jain et al. ........................ 710/62 |
| 7,716,667 | B2 * | 5/2010 | van Rietschote et al. ......... 718/1 |
| 7,725,893 | B2 * | 5/2010 | Jaeckel et al. ..................... 718/1 |
| 2004/0010787 | A1 * | 1/2004 | Traut et al. ........................ 718/1 |
| 2006/0248528 | A1 * | 11/2006 | Oney et al. ........................ 718/1 |

FOREIGN PATENT DOCUMENTS

| CN | 1249877 A | 4/2000 |
| CN | 1490724 A | 4/2004 |

* cited by examiner

*Primary Examiner* — Gregory A Kessler
(74) *Attorney, Agent, or Firm* — Blakely, Sokoloff, Taylor & Zafman LLP

(57) ABSTRACT

Method and apparatus for expedited virtual machine (VM) launch in VM cluster environment. In one embodiment, at least one VM is launched within a host platform. Once initialized, a VM may issue a hypercall to a VM monitor (VMM) of a VM host platform. In response, the VMM may capture a runtime image of the VM. In one embodiment, the VMM loads the runtime image of the VM within a node of the host platform as a child VM. In an alternative embodiment, the VMM issues a VM clone command to a VMM of a next host platform including the runtime image of the VM. In response, the VMM of the next platform loads the runtime image of the first VM within a node of the second host platform as a cloned VM. Other embodiments are described and claimed.

20 Claims, 10 Drawing Sheets

APPARATUS AND METHOD FOR EXPEDITED VIRTUAL MACHINE (VM) LAUNCH IN VM CLUSTER ENVIRONMENT

RELATED APPLICATIONS

The present patent application is a non-provisional application claiming priority to International Application No. PCT/CN2005/001623, filed Sep. 29, 2005, currently pending.

FIELD

One or more embodiments relate generally to the field of computer system design. More particularly, one or more of the embodiments relate to a method and apparatus for expedited virtual machine (VM) launch in a VM cluster environment.

BACKGROUND

A virtual machine architecture logically partitions a physical machine, such that the underlying hardware of the machine is time-shared and appears as one or more independently operating virtual machines (VMs). A virtual machine monitor (VMM) creates the VM and runs on a computer to facilitate for other software the abstraction of one or more VMs. Each VM may function as a self-contained platform, running its own operating system (OS) and application software. The software running in a VM is collectively referred to herein as "guest software."

The guest software expects to operate as if it were running on a dedicated computer rather than in a VM. That is, the guest software expects to control various events and have access to hardware resources on the computer (e.g., physical machine). The hardware resources of the physical machine may include one or more processors, resources resident on the processors (e.g., control registers, caches and others), memory (instructions residing in memory, e.g., descriptor tables), and other resources (e.g., input/output devices) that reside in the physical machine. The events may include interrupts, exceptions, platform events (e.g., initialization) (NIT) or system management interrupts (SMIs), and the like.

Hence, a VMM presents to other software ("guest software," "guests" or simply "guest") the abstraction of one or more VMs. The VMM can provide the same or different abstractions to the various guests. Each guest expects the full facilities of the hardware platform presented in the VM to be available for its use. For example, the guest expects to have access to all registers, caches, structures, I/O devices, memory and the like according to the architecture of the processor and platform presented in the VM. Further, each guest expects to handle various events, such as exceptions, interrupts and platform events (e.g., initialization) (INIT) and system management interrupts (SMIs).

Some of these resources and events are privileged because they are managed by the VMM to ensure proper operation of VMs and to protect the VMM and other VMs. For the privileged resources and events, the VMM facilitates functionality desired by guest software, while retaining ultimate control over these resources and events. The act of facilitating the functionality for the guest software may include a wide variety of activities on the part of the VMM. The activities of the VMM, as well as its characteristics, do not limit the scope of various embodiments described herein.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for expedited virtual machine (VM) launch in a VM cluster environment are described. In one embodiment, the method includes the launch of at least one VM within a host platform. Once initialized, a VM may issue a hypercall to a VM monitor (VMM) of the VM host platform. As described herein, the host platform including the VM that issued the hypercall, may be referred to herein as the "VM host platform." In response to detection of a hypercall issued by the VM, in one embodiment, the VMM may capture a runtime image of the VM. In one embodiment, the VMM may load the runtime image of the VM within at least the VM host platform of a VM cluster environment. In one embodiment, the VMM may issue a VM clone command to a VMM of a next host platform including the runtime image of the VM. In response to the VM clone command, the VMM of the next host platform may load the runtime image of the VM as a cloned VM. In one embodiment, a copy-on-write technique is used to manage shared memory between a parent VM and a child VM.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate-level circuits have not been shown in detail to avoid obscuring the invention. Those of ordinary skill in the art, with the included descriptions, will be able to implement appropriate logic circuits without undue experimentation.

System

Figure 1:
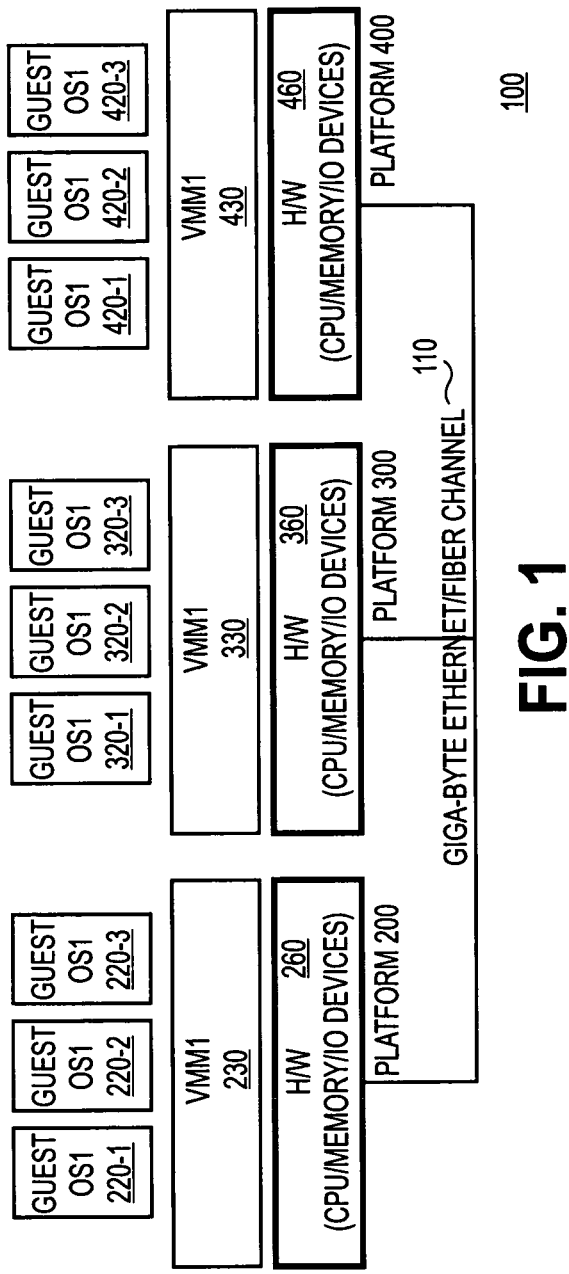
FIG. 1 is a block diagram illustrating a virtual machine (VM) cluster environment, in accordance with one embodiment.
Figure 2:
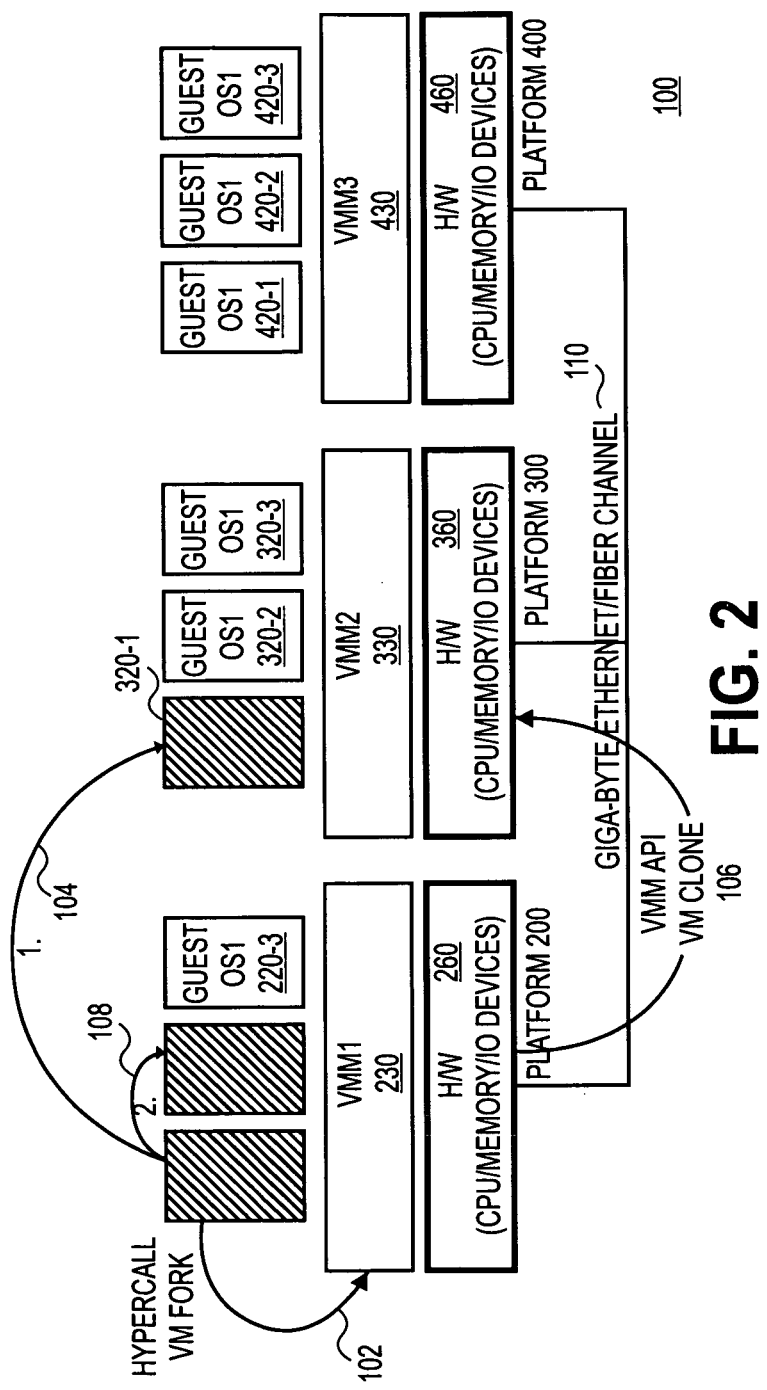
FIG. 2 is a block diagram further illustrating the VM cluster environment of FIG. 1 with expedited VM launch, in accordance with one embodiment.

FIG. 1 is a block diagram illustrating a virtual machine (VM) cluster environment 100, in accordance with one embodiment. In one embodiment, a method for expedited VM launch in VM cluster environment 100 illustrated in FIGS. 1 and 2 is described. As described herein, "VM launch" is based on a guest operating system (OS) creation time, which encompasses a time required for booting the guest OS, a time required for initialization of the guest OS and an application launching time. As described herein, "expedited VM launch" minimizes guest OS creation time required for VM launch by eliminating the time required for booting the guest OS, initialization of the guest OS and application loading.

Accordingly, the expedited VM launch of the various VMs within a VM cluster environment provides enhanced availability by reducing the amount of time required for VM launch. However, it should be recognized by those skilled in the art that the techniques for expedited VM launch, as described herein, may be applied to standalone platforms in which multiple VMs may operate, as well as chip multiprocessor (CMP) systems, which may support the simultaneous operation of multiple guest operating systems.

Referring again to FIG. 1, VM cluster environment 100 may include host platform 200, host platform 300 and host platform 400, which may be referred to as "host platform clusters." In the embodiments described, VM cluster environment 100 may include any number of host platforms as desired, according to the final system configuration. Representatively, host platforms 200, 300 and 400 are coupled together via a communications link 110. In one embodiment, the communications link may include, but is not limited to, gigabit (GB) Ethernet, fiber channel, or other like communications links. Representatively, host platform clusters 200/300/400 are illustrated according to a standalone virtual machine monitor (VMM) configuration, including VMMs 230, 330 and 430 within host platform clusters 200, 300 and 400, respectively, of VM cluster environment 100.

As shown in FIG. 1, VM cluster environment 100 is illustrated as a nine node VM cluster environment, wherein each platform includes three nodes for loading guest operating systems 220, 320 and 420. Representatively, guest OS 220 (220-1, 220-2, 220-3) are loaded within host platform 200; guest OS 320 (320-1, 320-2, 320-3) are loaded within host platform 300; and guest OS 420 (420-1, 420-2, 420-3) are loaded within host platform 400. As will be recognized by those skilled in the art, the embodiments described for the expedited VM launch are not limited to the nine node VM cluster environment 100, as shown in FIGS. 1 and 2, and may include any number of nodes while remaining within the scope of the described embodiments.

As described herein, in one embodiment, the configuration of VM cluster environment 100 is based on the following presumptions: (1) VMM 230/330/430 can be different, but at least comply with the same VMM application programming interface (API) and provide the same hypercall interfaces for the various guest operating systems (OS); (2) the VM interface for the clustered guest OSs 220/320/420 is the same; (3) clustered guest OS kernel and software configurations are identical for the guest OS 220/320/420; and (4) the VMs in one cluster have the same usage; and therefore, operate as VM workers, in accordance with one embodiment.

In VM cluster environments, for example, as shown in FIGS. 1 and 2, the creation time for loading the VMs, including guest OS 220/320/420 and other required applications can vary depending on the cluster size and specifically, the number of nodes within the VM cluster environment. Generally, the creation time for a VM may include the time required for booting the guest OS, initialization of the guest OS, and any application launched by the guest OS or other required services. In one embodiment, as shown in FIG. 2, a VMM hypercall interface of VMMs 230/330/430 is modified to support a VM fork ( ) hypercall. As described herein, a hypercall may refer to a command issued by a VM, such as a guest OS, to request a host platform service or access a host platform resource.

Referring again to FIG. 2, VMM 230 launches guest OS on platform 200. After the necessary initialization, guest OS 220-1 may issue a VM fork ( ) hypercall to the hypercall interface of VMM 230, as indicated by arrow 102. In response to the VM fork ( ) hypercall issued by guest OS 220-1, VMM 230 may capture a runtime image of guest OS 220-1. By using the runtime image of guest OS 220-1, expedited VM launch of, for example, guest OS 220-2, is achieved by minimizing the guest OS creation time; specifically, the time required for booting of the guest OS, initialization of the guest OS and application launch of the guest OS is eliminated.

Referring again to FIG. 2, once VMM 230 has captured a runtime VM image of guest OS 220-1, VMM 230 has the option (Option 1 as indicated by arrow 104) of launching a clone VM of guest OS 220-1 within another platform, such as platform 300, or loading a child VM (Option 2 as indicated by arrow 108) according to the runtime image of guest OS 220-1 within a next node of platform 200. In accordance with Option 1, the launch of a VM on another platform is performed, in one embodiment, by VMM 230 issuing a VMM API VM clone command to another platform, such as platform 300, as shown in FIG. 2 and indicated by arrow 106.

In one embodiment, the VM clone command issued to host platform 300 includes the runtime image of guest OS 220-1 from host platform 200. Accordingly, in response to detection of a VM clone command issued by another platform, platform 300 will launch a VM clone, such as guest OS 320-1 according to the runtime VM image of guest OS 220-1. As described herein, "VM clone" may refer to a VM that is created according to a runtime image of a VM loaded within a different host platform cluster.

In one embodiment, the expedited launch of a VM child within a node of host platform 200 (see arrow labeled 108) may result in the sharing of memory between the parent VM 220-1 and the child VM 220-2. In other words, because child VM 220-2 is loaded with the runtime image of parent VM 220-1, parent VM 220-1 and child VM 220-2 share the same VMM configuration, the same VM definition, the same kernel definition, the same software configuration and the same runtime configuration. As a result, parent VM 220-1 and child VM 220-2 share memory 272 as parent/child processes do. In one embodiment, the VM fork ( ) hypercall process is supplemented by a copy-on-write technique, for example, as illustrated in FIG. 3.

Figure 3:
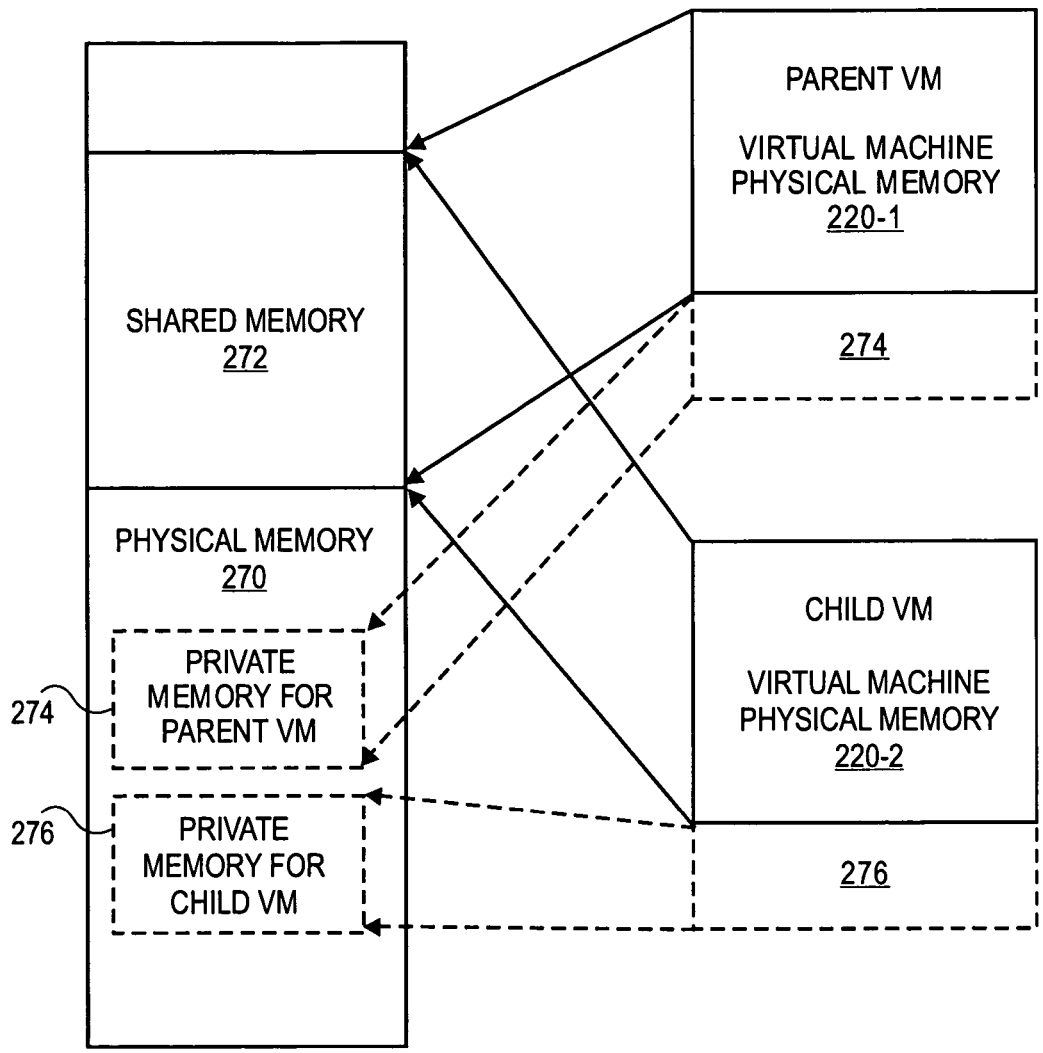
FIG. 3 is a block diagram illustrating the sharing of physical memory between parent and child VMs, in accordance with one embodiment.

FIG. 3 is a block diagram illustrating the sharing of physical memory 270 between parent VM 220-1 and child VM 220-2. As part of the sharing of memory, in one embodiment, a portion of physical memory 274 is allocated to parent VM 220-1 and a portion of physical memory is allocated as private memory 276 for child VM 220-1. In one embodiment, as described in further detail below, when a write is detected to shared memory 272, a trigger-on-write technique relocates the data to the allocated portion of private memory 274/276.

In one embodiment, pages may be shared between a parent VM 220-1 and a child VM 220-2. In one embodiment, a read/write (R/W) attribute in each page table (for x86 environment) or a R/W attribute in TLB (for Itanium platform) may be used to protect shared pages, as manufactured by the INTEL® Corporation. However, implementation details for the sharing of page tables between parent and child processes will vary depending on the central processing unit (CPU) architecture selected for the VM cluster environment 100 (FIGS. 1 and 2). Hence, other architecture attributes may be employed to facilitate the copy-on-write technique.

Figure 4:
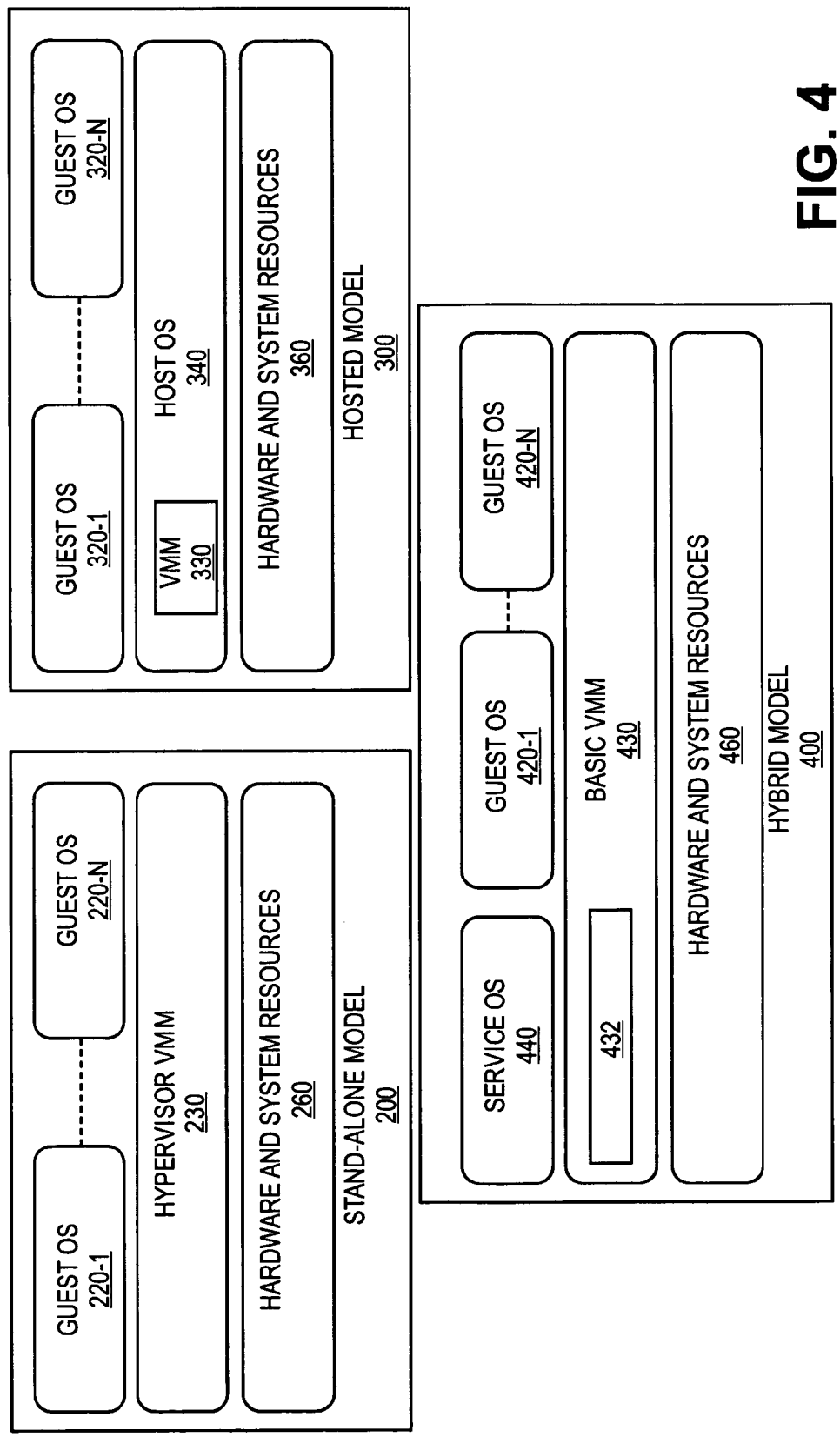
FIG. 4 is a block diagram illustrating alternative platform configurations of the host platforms illustrated in FIGS. 1 and 2, in accordance with one embodiment.

FIG. 4 is a block diagram illustrating various configurations for host platforms 200/300/400, as shown in FIGS. 1 and 2. As illustrated in FIGS. 1 and 2, host platforms are shown according to a standalone VMM model. In a standalone VMM model, the VMM runs directly on top of hardware resources, such as hardware resources 260/360/460. However, the various configurations for host platforms 200/300/400 are not limited to the standalone VMM model illustrated in FIGS. 1, 2 and 4. In one embodiment, the host platforms may be configured according to a host VMM configuration 200/300/400, as shown in FIG. 4.

Representatively, the host VMM model 300 includes VMM 330, which runs on top of host operating system (OS) 340. In a further embodiment, one or more of the host platforms 200/300/400 of VM cluster environment 100, as shown in FIGS. 1 and 2, may be configured according to a hybrid VMM model 400, as shown in FIG. 4. Representatively, hybrid VMM model 400 is comprised of service OS 440 and micro-hypervisor (basic VMM) 430, including optimized API 432. According to the hybrid VMM model 400, micro-hypervisor 430 may be responsible for CPU/memory resource virtualization and domain scheduling. Service OS may be responsible for VM management and device virtualization/simulation. In accordance with the embodiments illustrated in FIG. 4, expedited VM launch according to a VM hypercall may be performed according to any of the host platform configuration 200/300/400 shown in FIG. 4 or other like configurations, to reduce or minimize the creation time of a VM process by eliminating the OS launch process and application initialization.

TABLE 1

```
Hypercall VM fork pseudo code:
VM_fork(VM_type)
{
    if ( !VM_launched(calling)VM) )
        error( ):
    VM_block(calling_VM); // in order to get stable VM state.
    target_pf = get_target_pf(VM_type); // check load
balancing kind of policy to get platform.
    if (target_pf ! = current_pf) {
        save_VM_state(calling_VM, state_pointer);
        remote_VM_clone(target_pf, state_pointer);
    } if else {
        if ( child_VM=VM_fork(calling VM) ) {
            wait until launched (child_VM);
            VM_unblock(calling_VM);
        }
    else{
            Vmunblock(child_VM};
        }
    }
}
```

TABLE 2

```
VM_clone(source_platform, state_capsule) /* this is the counterpart of
remote_VM_clone( ) on the target platform */
{
    if (check_platform_compatiblity(source_platform, state_capsule))
        error ("this state capsule is not supported on VMM %d",
self_platform); /* check whether the state_capsule is
understandable on this platform */
    prepare_device_model_state(state_capsule);
    prepare_CPU_state(state_capsule);
    prepare_bootstrap_memory(state_capsule);
    new_VM = create_VM_descriptor(state_capsule);
    enter_run_queue(new_VM);
}
```

Pseudo-code for implementing the VM fork ( ) hypercall is shown in Table 1. Table 2 illustrates pseudo-code for the VMM API VM clone command. As indicated by the pseudo-code for implementing the VM hypercall as shown in TABLE 1, the VM fork hypercall directs the VMM to capture the runtime image of the calling VM. As illustrated by the pseudo-code for the VMM API VM clone command, the creation of the VM clone may require preparation of a device model state, a CPU state and a bootstrapping of memory, which are stored within a state capsule. From such state capsule, a new VM may be created and entered into a run queue for loading the cloned VM. Procedural flowcharts for implementing methods for expedited VM launch within a VM cluster environment are now described.

Operation

Figure 5:
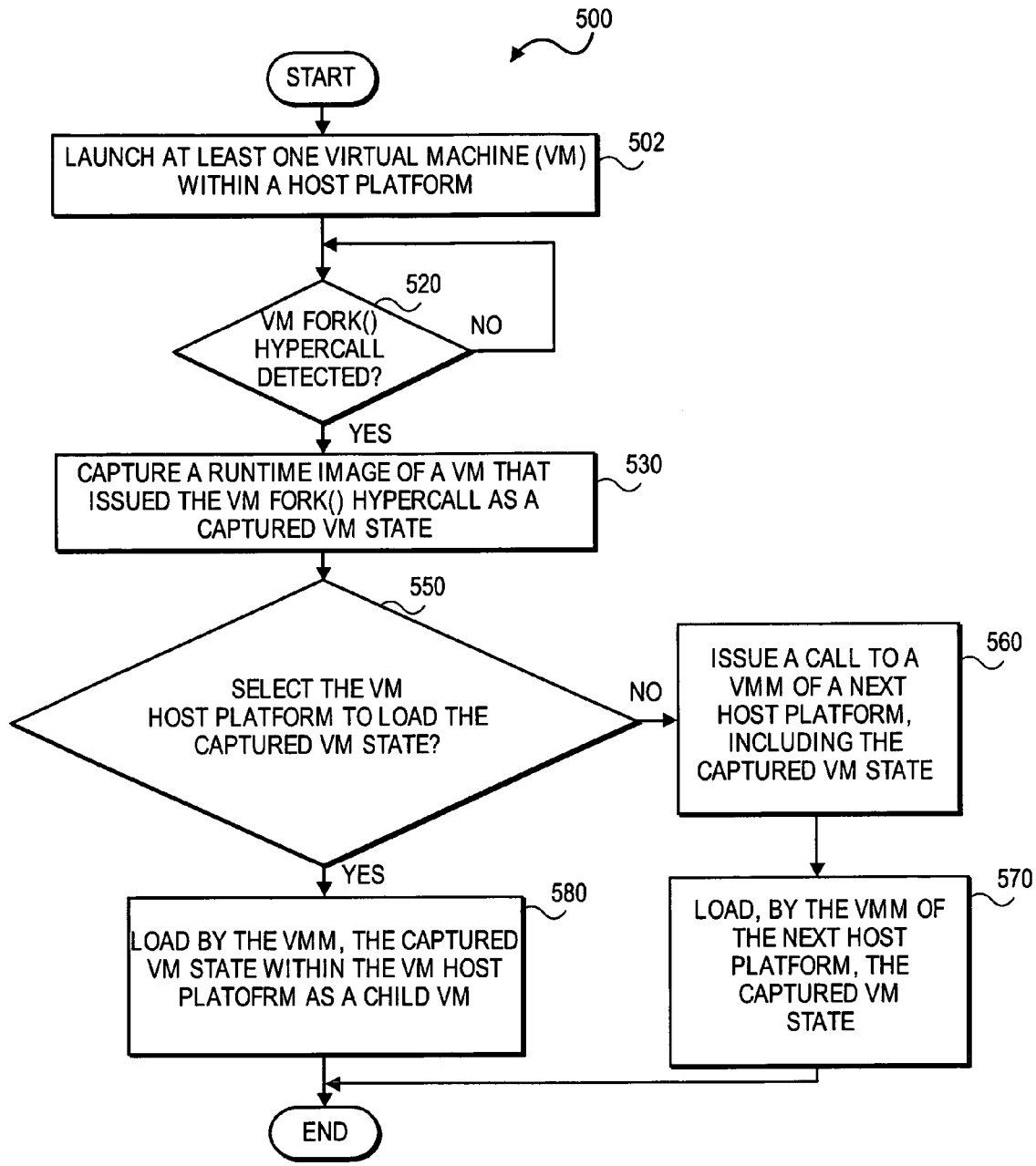
FIG. 5 is a flowchart illustrating a method for expedited VM launch in a VM cluster environment, in accordance with one embodiment.

Turning now to FIG. 5, the particular methods associated with embodiments of the invention are described in terms of computer software and hardware with reference to a flowchart. The methods to be performed by a computing device (e.g., a VMM) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 5 is a flowchart illustrating a method 500 for expedited virtual machine (VM) launch in a VM cluster environment, in accordance with one embodiment. In the embodiments described, examples of the described embodiments will be made with reference to FIGS. 1-5. However, the described embodiments should not be limited to the examples provided to limit the scope provided by the appended claims.

Referring again to FIG. 5, at process block 502, at least one virtual machine (VM) is launched within a host platform by, for example, a VM monitor (VMM) of a host platform, for example, as shown in FIG. 2. Once initialized, a VM may issue a hypercall to a virtual machine monitor (VMM) of a VM host platform. As described herein, the host platform including the VM that issued the hypercall, may be referred to herein as the "VM host platform." In one embodiment, the hypercall is a VM fork ( ) hypercall. In response to detection of, for example a VM fork ( ) hypercall, the VMM of the VM host platform may capture a runtime image of the VM according to the hypercall issued by the VM.

Once the VMM of the VM host platform has captured the runtime image of the VM, in one embodiment, the VMM decides whether to launch the VM within the VM host platform or a next host platform of a VM cluster environment. Accordingly, at process block 550, it is determined whether the VMM selects the VM host platform to load the runtime image of the VM as a child VM. When the VM host platform is selected, at process block 580, the VMM loads the runtime image of the VM within a node of the VM host platform as a child VM, with the VM that issued the VM fork ( ) hypercall as a parent VM of the child VM. Otherwise, at process block 560, the VMM of the first host platform may issue a call to a VMM of a next host platform of the cluster environment.

In one embodiment, the call is a VMM application program interface (API) VM clone command. Accordingly, in response to issuance or receipt of a VM clone command, a next platform or other platform within the VM cluster environment, for example, as shown in FIGS. 1 and 2, will load the runtime image received with the VM clone command within the next host platform.

As will be recognized, as described herein, the term "expedited VM launch" refers to the ability to load a VM, such as, for example, a guest operating system (OS) or creation of such guest OS with the creation time of the guest OS minimized since the OS launch process and application initialization process can be avoided. In one embodiment, when the VMM loads the runtime image as a child VM on the same platform, the expedited VM launch process can be further shortened by a copy-on-write technique, for example, as shown in FIG. 3.

Figure 6:
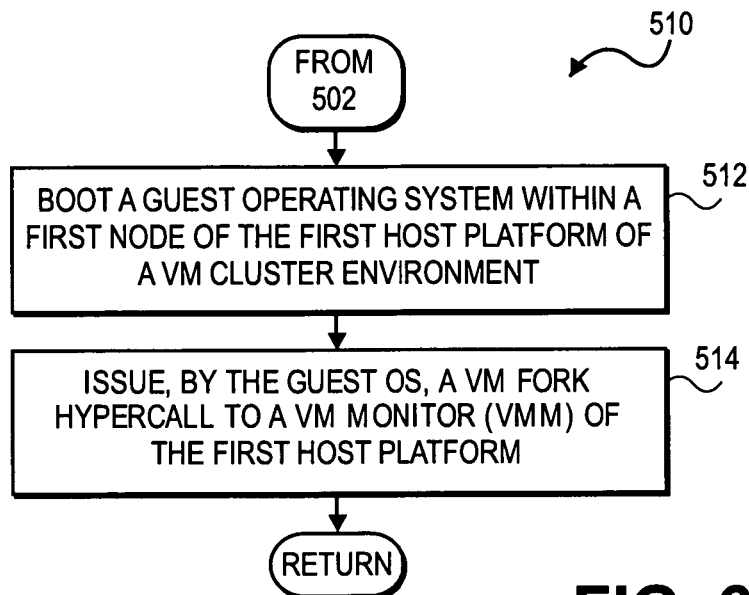
FIG. 6 is a flowchart illustrating a method for launching a guest operating system (OS), in accordance with one embodiment.

FIG. 6 is a flowchart illustrating a method 510 for loading the VM of process block 502 of FIG. 4, in accordance with one embodiment. At process block 512, a guest OS is booted within a first node of the first host platform of a VM cluster environment, such as, for example, shown in FIGS. 1 and 2, in accordance with one embodiment. Once the guest OS is loaded, the guest OS may issue a VM fork hypercall to the VMM of the first host platform. As indicated above, detection of the VM fork hypercall by the VMM monitor requires the VMM to select a node within the first host platform in which to load a child VM or select a next host platform in the cluster to issue a VM clone command so that the next host platform cluster may expedite VM launch by loading a VM clone within a node of the next host platform in the cluster.

Figure 7:
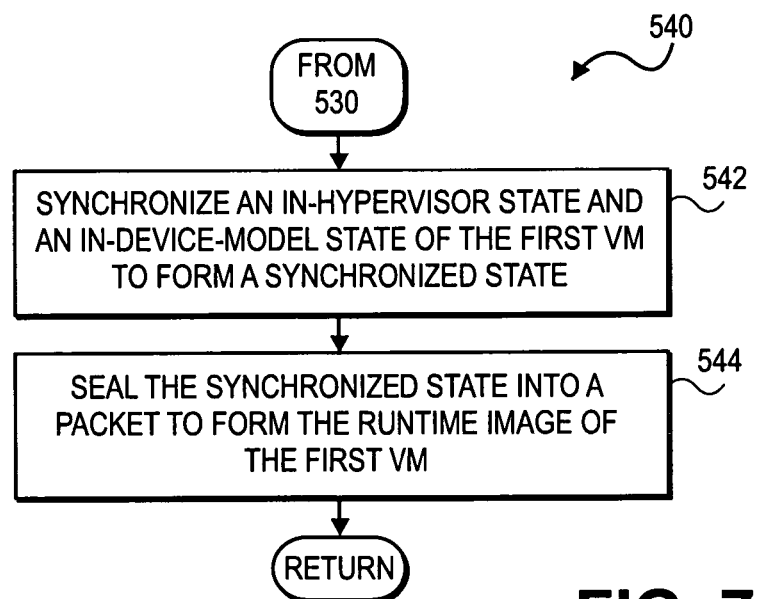
FIG. 7 is a flowchart illustrating a method for capturing a runtime image of a hybrid VM, in accordance with one embodiment.

FIG. 7 is a flowchart illustrating a method 540 for capturing the runtime image of the first VM. In the embodiment illustrated in FIG. 7, the first VM is configured according to a hybrid VMM module, such as hybrid VMM model 400, as shown in FIG. 4. Conversely, for the hypervisor VMM model 200, as shown in FIG. 4, and hosted VMM model 300, shown in FIG. 4, the host OS and hypervisor are able to control/manage each guest VM state. In doing so, the host OS and hypervisor are able to provide VM state isolation, which renders capturing of the VM state straightforward.

Conversely, for hybrid VMM model 400, as shown in FIG. 4, at process block 542, an in-hypervisor state and an in-device model state of the first VM are synchronized to form a synchronized state. Once synchronized, at process block 544, the synchronized state is sealed into a packet to form the runtime image of the first VM, which may be either loaded within a node of the current host platform or provided with a VM clone command to a selected next host platform cluster.

Figure 8:
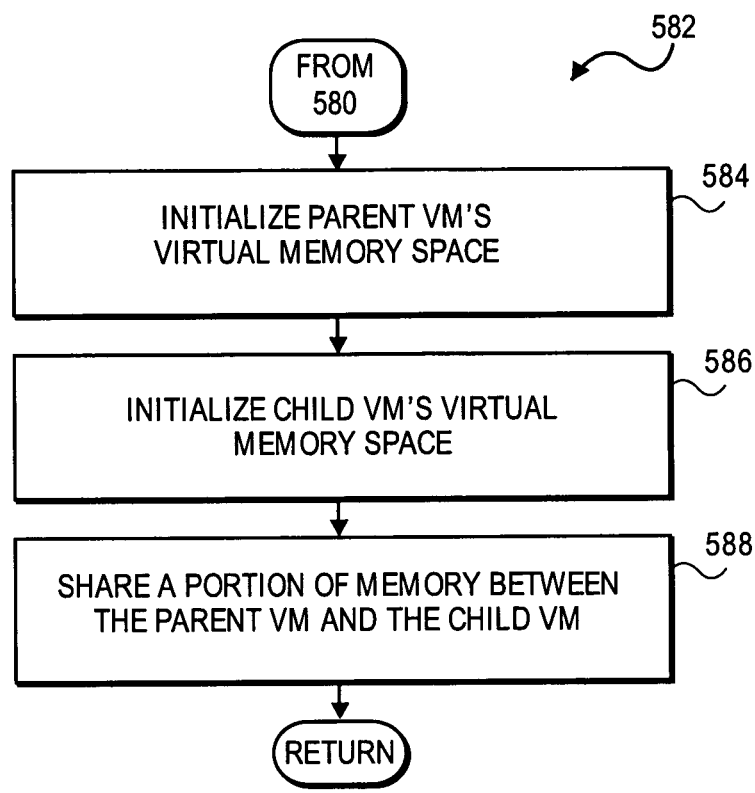
FIG. 8 is a flowchart illustrating a method for sharing of memory between a parent VM and a child VM, in accordance with one embodiment.

FIG. 8 is a flowchart illustrating a method 582 for operation of parent and child VMs, for example, as shown in FIG. 3, which are required to share memory. To enable the sharing of memory, at process block 584, a virtual memory space of the parent VM, for example, as shown in FIG. 3, is initialized. At process block 586, a virtual memory space of the child VM is initialized. In one embodiment, a virtual address to physical address mapping is provided to enable a copy-on-write technique, for example, as described in FIG. 9. Finally, at process block 588, the sharing of a portion of memory between the child VM and the parent VM is enabled.

In one embodiment, copy-on-write does not require the parent process/VM to claim additional physical memory in response to the VM fork ( ) hypercall because the parent has already mapped the needed memory. In one embodiment, child process/VM shares physical memory with his parent by mapping to the same piece of physical memory. As a result, physical memory allocation is not required. In one embodiment, the system establishes the virtual address to physical mapping for the child VM in response to the VM fork ( ) hypercall.

Figure 9:
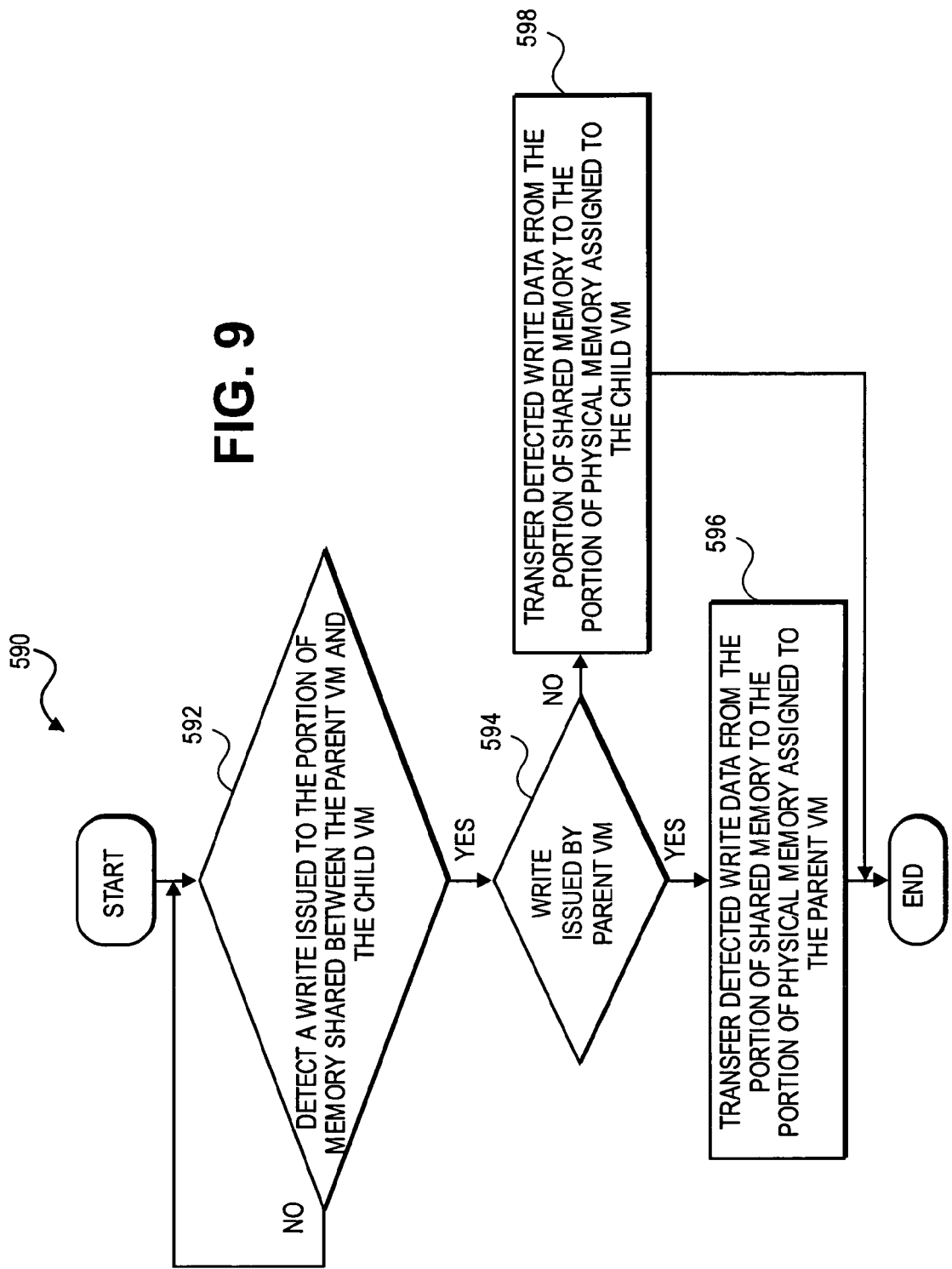
FIG. 9 is a flowchart illustrating a method for a copy-on-write technique employed on memory shared between a parent VM and a child VM, in accordance with one embodiment.

FIG. 9 is a flowchart illustrating a method 590 for a copy-on-write technique to enable sharing of memory between child VMs and parent VMs, in accordance with one embodiment. At process block 592, it is determined whether a detected write is issued to a portion of the memory shared between the parent VM and the child VM. Once a write is detected to the shared memory, at process block 594, it is determined whether the write is issued by the parent VM. If the write is issued by the parent VM, at process block 596, the detected write data issued to the portion of shared memory is transferred from the portion of shared memory to the portion of physical memory assigned to the parent VM. Otherwise, at process block 598, the detected write data issued to the shared memory is transferred from the portion of shared memory to the portion of physical memory assigned to the child VM.

Host Platform Architecture

Figure 10:
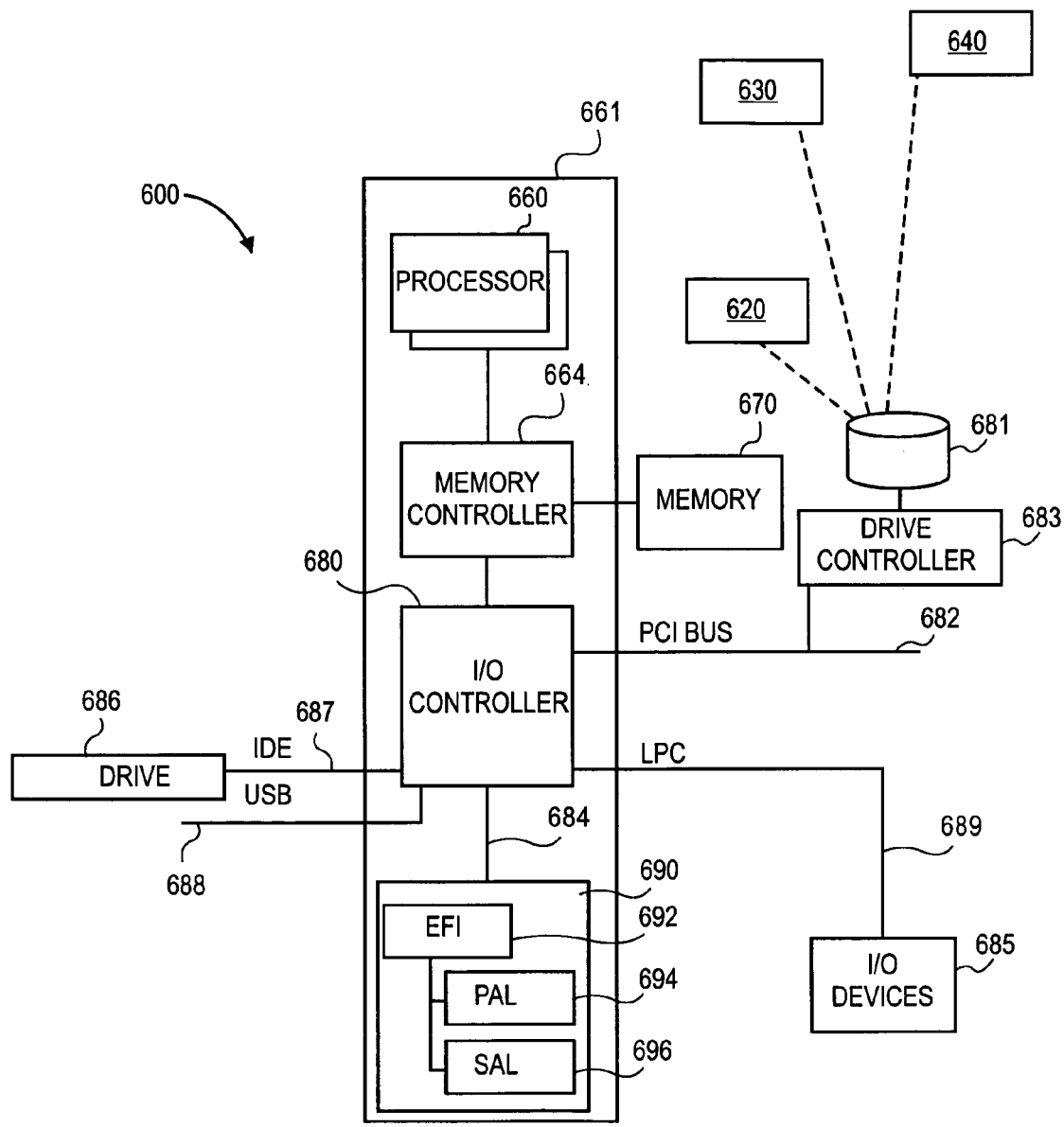
FIG. 10 is a block diagram illustrating a computer platform that may be implemented as a platform within the VM cluster environment illustrated in FIGS. 1 and 2, in accordance with one embodiment.

FIG. 10 is a block diagram illustrating a computer system 600 that may operate as a host platform cluster within the VM cluster environment 100, as shown in FIGS. 1 and 2, according to one embodiment. Initially, the guest OS 620, the VMM 630 and other like components, such as host firmware 640, are stored within the hard disk or disk memory 670, as shown in the computer system 600 of FIG. 10. Hence, any host firmware 640 is initially stored in non-volatile memory 690. Accordingly, the guest firmware 640 is initially stored on hard disk 674. In operation, the VMM 630 will load the guest firmware 640 from the hard disk 674 and copy the guest firmware 640 into a well-defined location, such as a predetermined block of memory.

As shown in FIG. 10, firmware 640 includes three major components: extensible firmware interface (EFI) 692 to provide guest OS software 620 access to the firmware components. Representatively, the firmware components include system abstraction layer (SAL) 696 and processor abstraction layer (PAL) 694. As described herein, EFI 692, SAL 696 and PAL 694 are collectively referred to herein as "host firmware." In one embodiment, host/guest OS 630 interacts with host firmware, specifically PAL 694 and SAL 696 via EFI interface 692, to provide an environment in which applications can be executed by the CPU. SAL 696 is a firmware layer that isolates an operating system and other higher level software from implementation differences in the platform. PAL 694 provides a consistent software interface to access the processor resources across different processor implementations and encapsulates all processor model-specific hardware.

Representatively, computer system 600 may be, for example, a personal computer system. Computer system 600 may include one or more processors (e.g., processor 660), a memory controller 664, an input/output (I/O) controller 670, and one or more BIOS (basic input/output system) memories (e.g., BIOS memory 670). In one embodiment, processor 660, memory controller 664, I/O controller 680 and BIOS memory 690 may reside on a chipset 661. As described herein, the term "chipset" is used in a manner well known to those of ordinary skill in the art to describe collectively, the various devices coupled to the processor 660 to perform desired system functionality. In an alternative embodiment, one or more of processor 660, memory controller 664, I/O controller 680 and BIOS memory 690 may reside on other types of component boards, for example, a daughter board.

The memory controller 664 controls operations between processor 660 and a memory device 670, for example, memory modules comprised of random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed storage of data. The I/O controller 680 may control operations between processor 660 and one or more input/output (I/O) devices 685, for examples, a keyboard and a mouse over a low pin count (LPC) bus 689. The I/O controller 680 may also control operations between processor 660 and peripheral devices, for example, a drive 686 coupled to I/O controller 680 via an integrated drive electronics (IDE) interface 687. Additional buses may also be coupled to I/O controller 680 for controlling other devices, for examples, a peripheral component interconnect (PCI) bus 682, or follow on bus (e.g., PCIx, PCI Express) and a universal serial bus (USB) 688. In one embodiment, the memory controller 664 may be integrated into processor 660 or integrated with I/O controller 680 into a single component.

In the embodiment illustrated, a driver controller 683 may be coupled to PCI bus 682 and may control operations of hard disk drive 681. In one embodiment, guest firmware 640, including guest EFI 692, guest SAL 696, guest PAL 694, guest OS 620 and VMM 630, may be stored on the hard disk drive 681. In this manner, the hard disk drive 681 may serve as the boot-up device including, for example, a loader program to load the various host components as well as the VMM 630 to load a VM as well as the various guest components, including guest firmware and one or more guest OS 620 within the VMM 630.

BIOS memory 690 may be coupled to I/O controller 680 via bus 684. BIOS memory 970 is a non-volatile programmable memory, for example, a flash memory that retains the contents of data stored within it even after power is no longer supplied. Alternatively, BIOS memory 690 may be other types of programmable memory devices, for examples, a programmable read only memory (PROM) and an erasable programmable read only memory (EPROM). Computer system 600 may also include other BIOS memories in addition to BIOS memory 690.

Accordingly, as shown in FIG. 10, BIOS memory 690 may include host platform firmware for initializing the computer system following system reset. As described herein, the host firmware includes EFI 692, SAL 696 and PAL 694. Accordingly, as described herein the guest firmware 640 is loaded during boot-up of computer system 600 to provide a host platform. Following the boot-up, the host platform will load VMM 630, which is responsible for loading the guest firmware 640, one or more guest OS 630 and other like components from hard disk 681.

Figure 11:
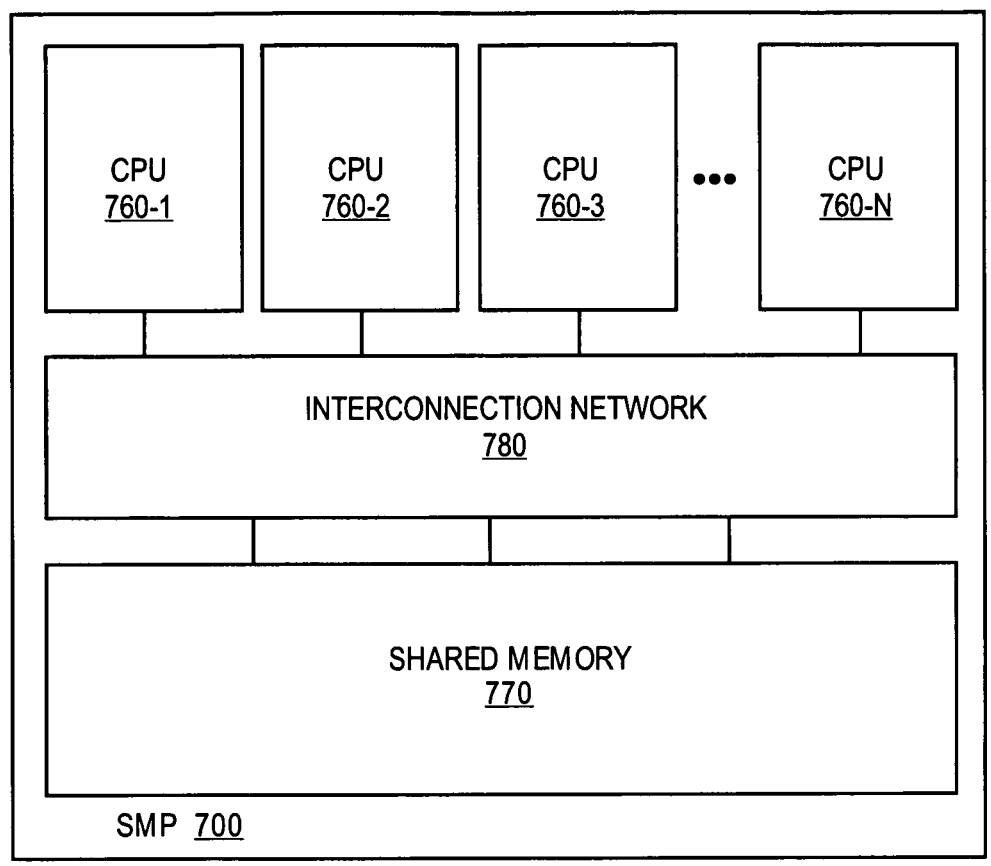
FIG. 11 is a block diagram illustrating a chip multiprocessor (CMP) computer system, which may implemented as a platform within the VM cluster environment illustrated in FIGS. 1 and 2, in accordance with one embodiment.

FIG. 11 is a block diagram illustrating a symmetric multiprocessing (SMP) system 700, which may operate as host platform of VM cluster environment 100 (FIGS. 1 and 2), in accordance with one embodiment. Representatively, SMP 700 may contain a chip multi-processor (CMP) including a plurality of processor cores 760 (760-1, . . . , 760-N), which are fabricated on the same die. As illustrated, processor cores (CPU) 710 are coupled to interconnection network 780 to access shared memory 770. In one embodiment, each CPU 710 includes a private core cache hierarchy (not shown), which may be used for the temporary storage or caching of data.

Representatively, CPUs 760 access shared memory 770 via interconnection network 780. In one embodiment, shared memory 770 may include, but is not limited to, a double-sided memory package including memory modules comprised of random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed storage of data.

Accordingly, in the embodiments described, the expedited VM launch process enables the loading of a child VM, or clone VM, within a respective node of the VM cluster environment, for example, as shown in FIGS. 1 and 2, which may include host platforms, such as computer system 600 (FIG. 10), CMP 700 (FIG. 1) or other like computer architecture. This technique is referred to as an "expedited VM launch" since the use of the VM fork ( ) hypercall and new VM API management VM clone command minimize the guest OS creation time of the respective VM by eliminating the time required to boot the guest OS, initialization of the guest OS and application launch required by the guest OS by the introduction of the VM fork hypercall, as described herein.

Accordingly, by utilizing the VM fork ( ) hypercall command and VM clone command, an expedited VM launch process is provided, as compared to a conventional VM launch, since the OS launch process required for creation of a guest OS and application initialization process, as well as the application load process, can be avoided. Furthermore, in the embodiments described, if a child VM is loaded on the same platform, the process can be further expedited by providing a copy-on-write technique, for example, as shown in FIG. 4, according to the embodiments described. Accordingly, by using the expedited VM launch process, enhanced high-availability of a VM cluster environment, such a VM cluster environment 100 shown in FIGS. 1 and 2, is provided with increased availability because the amount of time in which the VMs are unavailable is reduced.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the above detailed description of various embodiments of the invention, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method comprising:
modifying a hypercall interface of a first virtual machine monitor (VMM) to support a virtual machine (VM) fork hypercall;
capturing a runtime image of the VM in response to the VM fork hypercall issued by the VM to a first VMM of a first host platform of a VM cluster environment; and
loading the runtime image of the VM on a second host platform of the VM cluster environment, the second host platform having a second VMM, wherein loading the runtime image comprises issuing a VM clone command by the first VMM to the second VMM of the second host platform.

2. The method of claim 1, wherein prior to capturing, the method further comprises:
booting the VM within a first node of the first host platform of the VM cluster environment; and
issuing, by the VM, the VM fork hypercall to the first VMM of the first host platform.

3. The method of claim 1, wherein loading the runtime image comprises:
launching, by the second VMM, a VM clone in response to issuing the VM clone command by the first VMM, wherein the VM clone is according to the runtime image of the VM.

4. The method of claim 3, further comprises:
selecting the second host platform of the VM cluster environment to load the VM clone within a node of the second host platform.

5. The method of claim 3, wherein the VM clone command is a VMM application programming interface (API) clone command which eliminates time required to boot the VM.

6. The method of claim 1, wherein loading the runtime image further comprises:
issuing a call to the second VMM of the second host platform within the VM cluster environment, including the runtime image of the VM; and
loading, by the second VMM of the second host platform, the runtime image of the VM within the second host platform.

7. The method of claim 1, wherein the first and second host platforms are communicatively coupled to one another.

8. The method of claim 1, wherein the first and second VMMs comply with a same VMM application programming interface (API), and wherein the method further comprises determining, by the first VMM, whether to launch a VM within the first host platform of the VM cluster environment or the second host platform of the VM cluster environment, in response to capturing the runtime image of the VM.

9. An article of manufacture having a machine-readable storage medium having associated data wherein the data, when accessed, results in a machine performing:
launching a parent virtual machine (VM) within a node of a first host platform in a cluster;
modifying a hypercall interface of a first virtual machine monitor (VMM) to support a VM fork hypercall;
capturing a runtime image of the parent VM in response to the VM fork hypercall issued by the parent VM to a first VMM of the first host platform in the cluster; and
loading the runtime image of the parent VM on the second host platform having a second VMM, wherein loading the runtime image comprises issuing a VM clone command by the first VMM to the second VMM of the second host platform.

10. The article of manufacture of claim 9, wherein the machine readable storage medium further comprises data, which when accessed, results in the machine further performing:
issuing a call to the second VMM of the second host platform in the cluster, including the runtime image of the parent VM; and
loading, by the second VMM of the second host platform in the cluster, the runtime image of the parent VM within a node of the second host platform in the cluster.

11. The article of manufacture of claim 9, wherein the first and second VMMs comply with a same VMM application programming interface (API), and wherein the machine-readable storage medium further comprises data, which when accessed, results in the machine to perform a further method comprising:
determining, by the first VMM, whether to launch a VM within the first host platform of the VM cluster environment or the second host platform of the VM cluster environment, in response to capturing the runtime image of the VM.

12. The article of manufacture of claim 9, wherein the first and second host platforms are communicatively coupled to one another.

13. The article of manufacture of claim 9, wherein the machine readable storage medium further comprises data, which when accessed, results in the machine to perform prior to capturing, a method comprising:
booting the parent VM within a first node of the first host platform of the cluster; and
issuing, by the parent VM, the VM fork hypercall to the first VMM of the first host platform.

14. The article of manufacture of claim 9, wherein the machine readable storage medium further comprises data, which when accessed, results in the machine to a method comprising:

launching, by the second VMM, a VM clone in response to issuing the VM clone command by the first VMM, wherein the VM clone is according to the runtime image of the VM.

15. The article of manufacture of claim 14, wherein the machine readable storage medium further comprises data, which when accessed, results in the machine to a method comprising:

selecting the second host platform of the VM cluster environment to load the VM clone within a node of the second host platform.

16. A computer system comprising:

a first host platform including a first virtual machine monitor (VMM) and a node, wherein a hypercall interface of the first VMM is modified to support a virtual machine (VM) fork hypercall;

a communication link; and a second host platform, coupled to the first host platform via the communication link, including a second VMM and a node; wherein the first VMM to:

capture a runtime image of a virtual machine (VM) within the node of the first host platform in response to a VM fork hypercall issued by the VM to the first VMM; and load the runtime image of the VM on the second host platform, wherein the first VMM to load the runtime image by issuing a VM clone command by the first VMM to the second VMM of the second host platform.

17. The system of claim 16, wherein the first and second host platforms comprise:

a hypercall interface for the first and second VMMs, the hypercall interface to receive hypercalls issued by a VM and a VMM interface to receive a VMM clone command issued by a host platform.

18. The computer system of claim 16, wherein the host platform comprises:

a system memory coupled to an interconnection network; and a chip multiprocessor comprising a plurality of processor cores, wherein each processor core to support a VMM with two nodes, each node loaded with a VM.

19. The computer system of claim 16, wherein the second VMM is operable to launch a VM clone on the node of the second host platform in response to issuing the VM clone command by the first VMM, wherein the VM clone is according to the runtime image of the VM.

20. The system of claim 16, wherein the first and second VMMs comply with a same VMM application programming interface (API), and wherein the first VMM to determine whether to launch a VM within the first host platform or the second host platform, in response to capturing the runtime VM.

* * * * *